United States Patent
Barbosa et al.

(10) Patent No.: US 7,493,008 B2
(45) Date of Patent: Feb. 17, 2009

(54) GLASS FOR OPTICAL AMPLIFIER FIBER

(75) Inventors: Luiz Carlos Barbosa, Campinas (BR); Carlos Lenz Cesar, Campinas (BR)

(73) Assignee: Ericsson Telecommicacoes S.A., Sao Paolo (BR)

( * ) Notice: Subject to any disclaimer, the term of this patent is extended or adjusted under 35 U.S.C. 154(b) by 0 days.

(21) Appl. No.: 10/592,480

(22) PCT Filed: Mar. 11, 2004

(86) PCT No.: PCT/BR2004/000027
§ 371 (c)(1), (2), (4) Date: Jun. 25, 2007

(87) PCT Pub. No.: WO2005/087674
PCT Pub. Date: Sep. 22, 2005

(65) Prior Publication Data
US 2007/0274665 A1    Nov. 29, 2007

(51) Int. Cl.
*G02B 6/02* (2006.01)
*C03B 37/023* (2006.01)
*C03C 3/12* (2006.01)

(52) U.S. Cl. ............... 385/142; 501/41; 65/388; 359/341.1

(58) Field of Classification Search ........... None
See application file for complete search history.

(56) References Cited

U.S. PATENT DOCUMENTS 4,732,875 A * 3/1988 Sagara ............... 501/42
5,251,062 A * 10/1993 Snitzer et al. ............ 359/341.1
6,194,334 B1 * 2/2001 Aitken et al. .............. 501/41
6,352,950 B1 * 3/2002 Aitken et al. .............. 501/37
6,413,891 B1 * 7/2002 Cho et al. ................. 501/41
6,821,917 B2 * 11/2004 Taylor et al. .............. 501/41
2002/0082156 A1 * 6/2002 Aitken et al. .............. 501/41
2003/0231852 A1   12/2003 Moore et al.

FOREIGN PATENT DOCUMENTS

EP    0 858 976    8/1998

(Continued)

OTHER PUBLICATIONS

M. Naftaly, S. Shen and A. Jha, "$Tm^{3+}$ doped tellurite glass for broadband amplifier at 1.47 μm", Appl. Opt. 39(27), Sep. 20, 2000, pp. 4979-4984.

(Continued)

*Primary Examiner*—Michelle R Connelly Cushwa
(74) *Attorney, Agent, or Firm*—Nixon & Vanderhye P.C.

(57) ABSTRACT

A tellurite glass composition doped with a first lanthanide, preferably Tm, and codoped with another lanthanide oxide, e.g. Ho, is provided. The glass includes 4-12 mole % of alkalihalide XY, X being selected from the group of Li, Na, K, Rb, Cs and Fr and Y being selected from the group of F, Cl, Br and I. A preferred glass contains about 10 mole % of the alkalihalide CsCl. The addition of alkalihalide XY results in an enhanced energy transfer from the first to the second lanthanide ion, whereby the lower energy level of the first lanthanide ion is depopulated. The ratio between upper and lower energy level lifetimes for the first lanthanide ion can be reduced to a value below one, enabling efficient amplifier fibers.

23 Claims, 3 Drawing Sheets

FOREIGN PATENT DOCUMENTS

| | | |
|---|---|---|
| JP | 62 288 135 A | 12/1987 |
| WO | WO 2004/028992 A1 * | 4/2004 |

OTHER PUBLICATIONS

S. Shen et al., Compositional Effects and Spectroscopy of Rare Earths ($Er^{3+}$, and $Nd^{3+}$) in Tellurite Glasses, Compt Rendu Chimie, 5, pp. 921-938 (received Jun. 14, 2002).

G. Özen, B. Demirata, M. L. Öveçoglu and A. Genç, "Thermal and optical properties of $Tm^{3+}$ doped tellurite glasses", Spectrochim. Acta, Part A 57 (2001), pp. 273-280 (received Jun. 22, 2000).

E. R. Taylor et al., "Spectroscopy of $Tm^{3+}$-doped tellurite glasses for 1470 nm fiber amplifier", J. Appl. Phys. 92, No. 1, pp. 112-117 (Jul. 1, 2002).

Database WPI, Section Ch, Week 198804, XP002307803.

* cited by examiner

GLASS FOR OPTICAL AMPLIFIER FIBER

This application is the US national phase of international application PCT/BR2004/000027, filed 11 Mar. 2004, which designated the U.S., the entire content of which is hereby incorporated by reference.

TECHNICAL FIELD

The present invention relates to optical fibers and in particular to a tellurite glass composition suitable for use in an optical fiber for amplification of optical signals.

BACKGROUND

Telecommunication networks of today generally employ optical fibers for signal transmission. Optical signals are transported long distances on one or a plurality of optical carriers and features like long legs and power splitting necessitate amplification or regeneration of weakened signals. Optical amplification is often the most desirable option, since it offers direct amplification without problematic conversion between optical and electric signals.

Optical amplifiers typically comprise a comparatively short amplifier fiber doped with a rare-earth metal or another substance that is capable of fluorescing. Light of the same wavelength as the input signals is pumped into the amplifier fiber by a pump laser and absorbed photons cause electrons of the rare-earth atoms to jump to a temporary excited stage. As the electrons decay, photons are released and added to the input signal, increasing its gain.

For the conventional (C) band, it is well known to use erbium doped fiber amplifiers (EDFA), which has been thoroughly researched. The increasing demand for bandwidth in wavelength division multiplexing (WDM) optical communication systems has lead towards extending the transmission bands outside the C-band. Below the C-band, there is the so-called S-band (1460-1520 nm) for which fiber amplifiers doped with thulium ions ($Tm^{3+}$), presenting a 1470 nm emission band, are suitable. Thulium doped fiber amplifiers (TDFA) provide excellent positioning in the supporting band as well as a high power conversion efficiency originating from the rare earth based nature.

TDFA thus hold the potential to enable larger transmission capacity in the future. Several glass systems have been researched, highlighting silicate, fluoride and, most recently, tellurite glasses doped with thulium ions ($Tm^{3+}$). However, there are some problems that have to be overcome before an efficient optical amplifier doped with $Tm^{3+}$ can be fabricated. Thulium doped glass systems involve four energy levels, including the $^3H_4$ and $^3F_4$ levels, respectively. These glasses are limited by the fact that lifetime of the lower level is larger than that of the upper level, which means that basic Tm-fibers are inoperative as amplifiers. Therefore, in order to fabricate a well-functioning optical amplifier using thulium as dopant, the lower level needs to be depopulated. Three methods have been used for both silicate and fluoride glasses: up conversion pumping; laser oscillation of band at 1.8 µm; and co-doping with holmium ions ($Ho^{3+}$). Transition in 1470 nm is not available in silica glasses because $^3H_4$ level drops by predominantly non-radioactive mechanisms. While all three processes were successfully demonstrated in fluoride glasses, such glasses present a poor chemical durability and are very difficult to fabricate as low loss optical fibers.

Consequently, a glass system that combines the optical properties of fluoride glasses with the physical properties of silica glasses would be very desirable, and these requirements are met by the tellurite (Te) glasses. Tellurite glasses have been found to provide a broader thulium emission spectrum than other glasses. Hence, tellurite glass optical fibers result in broader band optical amplifiers for WDM, enabling an increased number of wavelength optical channels. At the same time, the solubility of the rare earth element is comparatively high, resulting in a very high gain per unit length. Due to the high doping level, amplifiers comprising tellurite glass only require centimeter long optical fibers.

A key issue in order to provide efficient tellurite based TDFAs is thus to overcome the fast lifetime in the signal transition band ($^3H_4$-$^3F_4$) to achieve a good inversion for the amplification process. Several tellurite glass compositions doped with thulium have been proposed in the prior art. In [1], for example, tellurite glasses of the $TeO_2$—$ZnO$—$Na_2O$ family doped with $Tm^{3+}$ ions are described. The glasses have significant advantages, mainly when combined with tellurite glasses doped with $Er^{3+}$ ions. However, the authors did not manage to depopulate $^3F_4$ lower level, which lifetime is always larger than that of the $^3H_4$ upper level. Document [2] also concern glasses of the $TeO_2$—$ZnO$—$Na_2O$ family. Here, the authors failed to depopulate the lower level, even with co-doping of $Ho^{3+}$ ions or $Tb^{3+}$ ions. The lifetime of the $^3H_4$ upper level is always shorter than that of $^3F_4$ lower level with these glasses.

Accordingly, problems associated with rare earth doped tellurite glasses for optical fiber amplifiers remain. To our knowledge, no tellurite glass with satisfactory transition lifetimes has been disclosed in the prior art and there is a need for an improved glass composition.

SUMMARY

A general object is to provide an improved glass composition suitable for use in an optical fiber amplifier. A specific object is to achieve enhanced energy transfer between a dopant and a codopant in a tellurite-based amplifier glass. Another object is to provide a tellurite glass for broadband amplification at the S-band. Still another object is to provide well-functioning Tm doped optical amplifiers.

These objects are achieved in accordance with the attached claims.

The technology described relates to tellurite glasses that are doped with a lanthanide oxide. Amplification between certain energy levels of the lanthanide ion is desired, but in order to achieve this, the lower energy level needs to be depopulated. Therefore, the glass is codoped with a second lanthanide to which energy is transferred. Briefly, the invention achieves an improved optical amplifier fiber glass by adding a certain amount of alkalihalide, such as CsCl, to such a tellurite glass composition. The alkalihalide addition modifies the glass structure resulting in an enhanced energy transfer from the first lanthanide ion to the second lanthanide ion. The ratio between upper and lower energy level lifetimes for the first lanthanide ion is reduced to a value below one, enabling efficient amplifier fibers.

A tellurite glass composition suitable for optical amplifier fibers is thus provided. The glass is doped with a first lanthanide and codoped with another lanthanide oxide and optical amplification relies on energy transfer from the first lanthanide ion to the second lanthanide ion. It further includes 4-12 mole % of at least one alkalihalide XY for enhancing the energy transfer, X being selected from the group of Li, Na, K, Rb, Cs and Fr and Y being selected from the group of F, Cl, Br and I. A preferred glass contains about 10 mole % of the alkalihalide CsCl.

A preferred glass composition is doped with Tm and codoped e.g. with Ho. For such a glass the alkalihalide component results improved amplifier properties in the S-band enabling broadband optical amplifiers. Another advantage of the proposed tellurite glass is that it presents excellent thermal stability.

According to other aspects, an optical amplifier fiber, an optical amplifier, a laser device, and a method of manufacturing an optical amplifier fiber are provided.

DETAILED DESCRIPTION

In the following description, the "lanthanides" refers to the group of rare earth metals containing the elements La, Ce, Pr, Nd, Pm, Sm, Eu, Gd, Tb, Dy, Ho, Er, Tm, Yb and Lu. A "multicomponent" glass consists of at least three components (except for the dopants).

Figure 1:
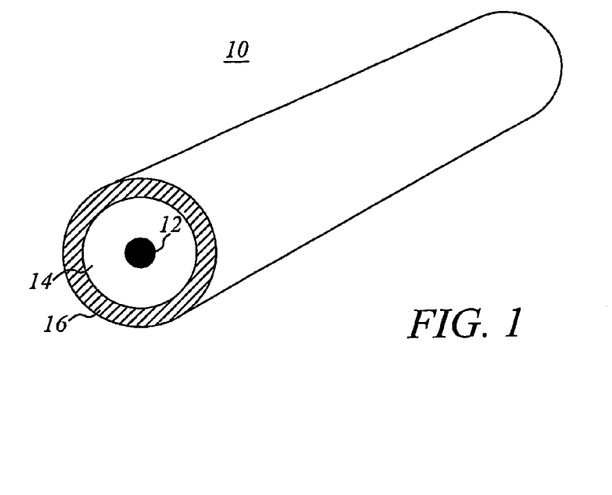
FIG. 1 is a schematic cross-sectional view of an exemplary embodiment of an optical amplifier fiber.

FIG. 1 illustrates the basic structure of a typical fiber-optic cable. An optical fiber 10 comprising a core 12 and a cladding 14 is shown. The core 12 is a transparent glass material through which a light beam travels. It is surrounded by another glass sheet, the cladding 14, which generally has a refractive index lower than that of the core. The cladding acts like a mirror, reflecting light back into the core, and the light beam is thus transmitted through the optical fiber 10 by means of internal reflection. The outer side of the optical fiber 10 is covered with a protective coating 16 of an insulating material.

As explained in the background section, a problem with tellurite glasses doped with $Tm^{3+}$ ions for operation at 1470 nm is that the lifetime of the lower level ($^3F_4$) is higher than the lifetime of the upper level ($^3H_4$). There are also other lanthanide doped glasses associated with too high lower level lifetime as compared to the upper level lifetime for the desired transition. The technology described aims at overcoming this problem and depopulate the lower level of the ions in a satisfactory manner. In particular, a main objective is to fabricate an optical fiber of tellurite glass doped with $Tm^{3+}$ ions such that the lower level lifetime is decreased to a value less than the lifetime of the upper level.

Figure 2:
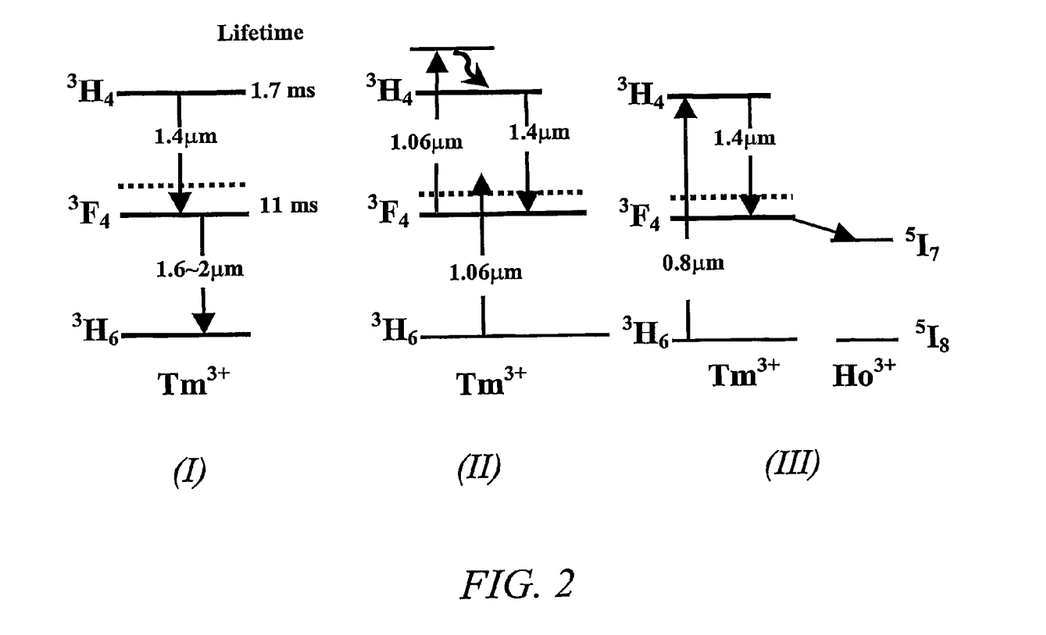
FIG. 2 contains three thulium energy level diagrams illustrating strategies for depopulating the $^3F_4$ level.

Some strategies for depopulating the $^3F_4$ level that may be used primarily for silicate and fluoride glasses are illustrated in FIG. 2. These are: up conversion pumping; laser oscillation of band at 1.8 μm; and co-doping with holmium ions ($Ho^{3+}$). In FIG. 2, the first (I) thulium energy level diagram describes a Tm doped fluoride glass, the second (II) shows a 1060 nm pumping scheme, whereas the third (III) diagram illustrates the energy transfer process of a Tm doped glass co-doped with Ho.

The tellurite glass composition proposed here uses energy transfer for depopulation of the lower energy level of the lanthanide ion used as dopant. Energy transfer is a mechanism where the electron in an excited state of an ion/atom/molecule (donor) decays to a lower state, with a simultaneous promotion of an electron of a neighbor ion/atom/molecule (acceptor) to an excited state. For a glass composition that is adapted for amplification at 1470 nm with the dopant Tm and co-doped with Ho this means that the electron in the $Tm^{3+}$ $^3F_4$ level falls down to the $^3H_6$ level and the electron in the $Ho^{3+}$ $^5I_8$ state goes up to the excited level $^5I_7$. The energy transfer is indicated by the arrow between the $Tm^{3+}$ $^3F_4$ level and the $Ho^{3+}$ $^5I_7$ level in FIG. 2 (III). The energy transfer effect requires that the donor emission curve overlaps the acceptor absorption curve, preferably to lower energy states. If the acceptor has lower levels to where the electrons can quickly decay, the average flux of energy transfer will be from donor to acceptor.

Besides the distance and the absorption/emission curves overlap, the energy transfer effect depends on the environment around the ion/atoms. The environment influence is very pronounced for rare earth ions because the optical transitions among the same 4f states are optically forbidden by selection rules and only happens due the ion/crystal field interactions. The energy transfer depends on the electrostatic interaction between electrons of the two neighboring ions. These interactions can in some cases be suppressed, for example by the environment dielectric constant but are sometimes instead enhanced by the presence of local electric field due to unbalanced charges and electric dipoles.

The technology in this case enhances the energy transfer mechanism between two different rare earth ions by including alkalihalides in the glass composition where the rare earth ions are embedded. The alkalihalide achieves this by bringing the ions close together and by creating crystal fields around them, whereby the selection rules are broken and the process becomes more efficient.

In particular, glass compositions are provided for amplification in the S-band with excellent amplifying characteristics. It has been discovered that addition of alkalihalides like CsCl, NaCl, KCl to tellurite glass compositions doped with Tm and codoped e.g. with Ho results in a considerably improved energy transfer mechanism. The ratio between upper and lower energy level lifetimes can with the invention be reduced to values below 1, resulting in efficient optical amplification. Glass compositions based on this knowledge are highly suitable for broadband optical fiber amplifiers.

The inverse lifetime ratio obtained with the invention will now be illustrated by way of example, primary with reference to Table 1A and Table 1B. Table 1A illustrates the lifetime of $Tm^{3+}$ ions in $TeO_2$—$ZnO$—$Li_2O$—$Bi_2O_3$—$CsCl$ glasses in accordance with the present invention, whereas Table 1B for comparison purposes contains corresponding lifetimes for glasses of the same base glass but without CsCl, i.e. $TeO_2$—$ZnO$—$Li_2O$—$Bi_2O_3$ glasses. The following glass system was used (Table 1A): (99.8-y) ($66TeO_2$-$15.5ZnO$-$5Li_2O$-$4Bi_2O_3$-$9.5CsCl$)+(0.2 to 2) $Tm_2O_3$+$yHo_2O_3$ (y=0.8 to 2). Single-mode optical fibers of these glasses with 5 μm-core diameter were measured with Ti-Sapphire laser pumping at 790 nm. The lifetimes of Table 1B were measured for the base glass $65TeO_2$-$15ZnO$-$18Li_2O$-$2Bi_2O_3$.

TABLE 1A

| | Glass A | Glass B | Glass C | Glass D | Glass E | Glass F |
|---|---|---|---|---|---|---|
| Tm [%] | 0.2 | 0.5 | 1.0 | 2.0 | 0.2 | 0.2 |
| Ho [%] | — | — | — | — | 0.8 | 2.0 |
| $^3H_4$ lifetime [ms] | 0.49 | 0.51 | 0.50 | 0.48 | 0.30 | 0.27 |

TABLE 1A-continued

|  | Glass A | Glass B | Glass C | Glass D | Glass E | Glass F |
|---|---|---|---|---|---|---|
| $^3F_4$ lifetime [ms] | 2.28 | 2.24 | 2.36 | 2.02 | 0.26 | 0.06 |
| $^3F_4/^3H_4$ | 4.65 | 4.39 | 4.72 | 4.2 | 0.86 | 0.22 |

TABLE 1B (prior art)

|  | Glass A | Glass B | Glass C | Glass E | Glass F |
|---|---|---|---|---|---|
| Tm [%] | 0.2 | 0.5 | 1.0 | 0.2 | 0.2 |
| Ho [%] | — | — | — | 0.8 | 2.0 |
| $^3H_4$ lifetime [ms] | 0.30 | 0.30 | 0.29 | 0.32 | 0.27 |
| $^3F_4$ lifetime [ms] | 2.0 | 2.4 | 2.0 | 2.1 | 1.80 |
| $^3F_4/^3H_4$ | 6.6 | 8 | 6.8 | 6.5 | 6.6 |

Glasses of different columns in the same table contain different amounts of $Tm^{3+}$ and $Ho^{3+}$. Within a table, changes were made only with respect to the $Tm^{3+}$ and $Ho^{3+}$ concentrations, and the base glass was thus kept constant. Glass A of Table 1A is basically the same as glass A of Table 1B, except for the CsCl component of Table 1A. The same holds for Glass B of Table 1A vs. glass B of Table 1B, etc.

The amplification process requires that the ratio between lower and upper lifetimes $^3F_4/^3H_4$ is less than 1. It is impossible to have amplification with this ratio equal or larger than one, in which case the population in the lower level would always be greater than in the upper level without the population inversion required for stimulated emission. A smaller ratio implies a more efficient amplification.

When comparing Table 1A and Table 1B, the effect of the present invention is clearly shown. The conventional glasses of Table 1B all have far too high $^3F_4/^3H_4$-values (all above 6) to be suitable for optical amplification. However, by including an alkalihalide such as CsCl in the glass composition like in Table 1A, inversion of lifetimes of transitions between $^3F_4 \rightarrow ^3H_4$ levels of $Tm^{3+}$ is obtained when co-coped with $Ho^{3+}$ ions. It is evident that by means of the invention, the $^3F_4$ lower level of $Tm^{3+}$ ions can be depopulated and its lifetime made to assume a value lower than that of the lifetime of the $^3H_4$ upper level. Glass compositions E and F of Table 1A, containing CsCl and being doped with both Tm and Ho, have lower/upper-ratios well below 1. This is to be compared with the corresponding glass compositions without CsCl, i.e. E and F of Table 1B, which have much higher lower/upper-ratios (6.5 and 6.6).

For the glasses containing the alkalihalide, a larger Ho-content implies a smaller $^3F_4/^3H_4$-value. It is generally not desirable to increase the Ho concentration above 2%, though, since then crystallization of the glass will occur. To achieve the excellent lifetimes shown in Table 1A, it is desirable with a glass containing at least 0.5 mole % $Ho_2O_3$. As shown in the table, the $Ho_2O_3$ content can with advantage exceed the $Tm_2O_3$ content.

Adding CsCl to the above $TeO_2$—ZnO—$Li_2O$—$Bi_2O_3$—$Tm_2O_3$—$Ho_2O_3$ glasses produces Te—Cl or Te—O—Cl bonds that creates variation in the symmetry of the crystal field, in such a manner that the vibration density of the matrix state provide a mechanism for depopulation of energy of $^3F_4$ state. The alkalihalide component is the main responsible for this $^3F_4$ lifetime shortening.

The improved lifetime ratio obtained according to the invention is related to glass structure changes. The advantageous structure is achieved by combining a high electronegativity element, such as one of the halides F, Cl, Br and I, with one of the alkalimetals Li, Na, K, Rb, Cs and Fr. The highly electronegative halide should be strong enough to replace oxygen bonds in $TeO_2$. This function has been confirmed by experimental results, see below.

As for the precise role of the alkalihalide (CsCl in a preferred embodiment), the following mechanisms are plausible. The very reactive halide element Cl may be responsible for the creation of charge centers around the rare earth ion, which increases the crystal field around the ions. This crystal field breaks the selection rules that do not allow the lifetime of the $^3F_4$ to $^3H_6$ transition to be decreased. The CsCl inclusion would also help to increase the bandwidth because the crystal fields would also inhomogeneously change the transition levels. Another possibility is that the halide can create new non-radioactive channels for charge transfer with the $^3F_4$ level.

Figure 3:
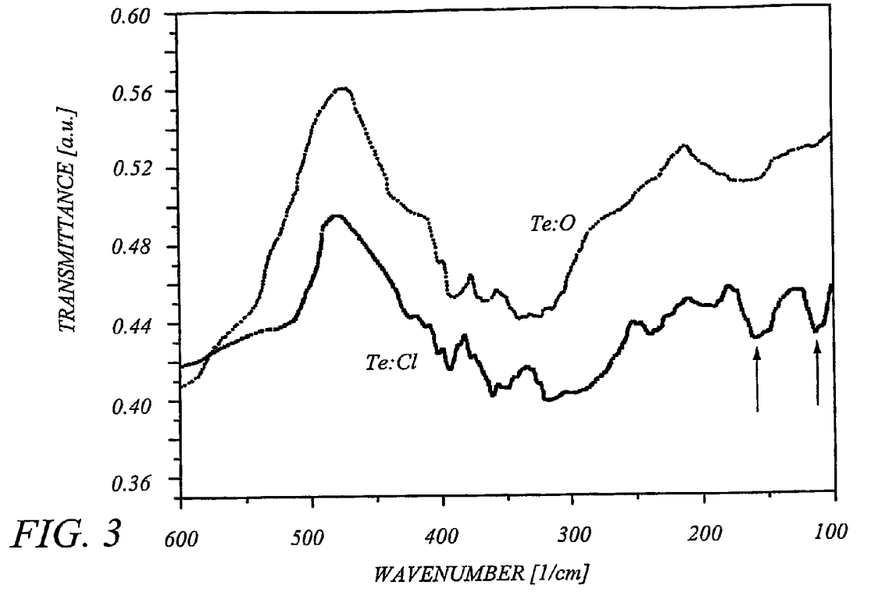
FIG. 3 contains infrared spectra for a prior-art tellurite glass and for an exemplary tellurite glass composition.

Furthermore, we have shown that the Cl ion of a glass in accordance with the present invention replaces one O of the $TeO_2$, making a Te—Cl bond. FIG. 3 contains infrared spectra of a tellurite glass composition with CsCl (lower curve, Te:Cl) and a glass composition without CsCl (upper curve, Te:O). The arrows indicate Te—Cl bond vibrations. The bands of the Te—Cl bond are only present in the CsCl—$TeO_2$-glass.

A major advantage of the technology is that it can be used to broaden the amplification region to the S band. Another advantage relies in the fact that the proposed glass not only presents the desired lifetime shortening but also improved thermophysical properties to draw optical fibers. Furthermore, it has excellent chemical durability, melting temperature (low), and gain linewidth.

Any alkalihalide XY, where X is Li, Na, K, Rb, Cs, Fr and Y is F, Cl, Br and I, can be used to achieve the improved energy transfer in accordance with the invention. However, glasses including Cl halides, such as CsCl, NaCl and KCl, are preferred. In particular, a most advantageous embodiment (exemplified e.g. in Table 1) achieves favorable energy level lifetimes through CsCl.

As for the amount of alkalihalide XY that should be added to a glass in order to obtain appropriate energy transfer and lifetime shortening, experimental results show that around 10 mole % or even less generally is sufficient. There is a rather sharp change in the thermal stability around 5 mole % and more than 12 mole % alkalihalide also results in inferior glass properties observed as onset of glass crystallization and a sudden drop in the thermal stability range. Consequently, the amount of alkalihalide XY in a glass composition in accordance with the invention should be 4-12 mole %. Preferred glasses comprise a least 8 mole % XY and the most preferred glasses contain about 10 mole %, i.e. 9-11 mole %, alkalihalide XY.

Some exemplary glass compositions in accordance with the invention will now be described. For a first examplary glass type, a known multicomponent glass family was used as starting point, more specifically the $TeO_2$—ZnO—$Na_2O$—$Bi_2O_3$ family (hereafter referred to as TZNBi), as disclosed in [3]. The major modification of the original TZNBi composition is addition of alkalihalide XY on behalf of the $TeO_2$-content. A second examplary tellurite glass type comprises $WO_3$ and will here be referred to as TW. (TW glasses may for example be based on the glass family described in [4].)

TABLE 2

| Glass | TeO$_2$ | ZnO | R$_2$O | Bi$_2$O$_3$ | XY | Tm$_2$O$_3$ | Ho$_2$O$_3$ |
|---|---|---|---|---|---|---|---|
| TZNBi | 55-90 | 0-35 | 0-35 | 0-20 | 4-12 | 0.2-2 | 0.2-2 |

Table 2 contains mole % ranges for example TZNBi-glasses in accordance with the present invention. The substances ZnO, R$_2$O (R=Li, Na, K, Rb, Cs) and Bi$_2$O$_3$ have ranges with zero as lower limit, but are positive numbers, not actually assuming the value zero. In other words, the proposed TZNBi-glasses always contain a certain amount of these substances. As previously mentioned, the XY-content in the glasses is preferably between 9 (or at least 8) and 11 mole %. The glasses are preferably doped with 0.2 to 2 mole % Tm$_2$O$_3$ and 0.2 to 2 mole % Ho$_2$O$_3$.

A preferred TZNBi glass includes Li$_2$O (R=Li), which results in an even higher thermal stability range than for glasses with for example Na$_2$O. Bi$_2$O$_3$ can be used to control the refractive index of the glass. Normally, different amounts of Bi$_2$O$_3$ will then be used in the core and cladding, respectively.

TABLE 3

| Glass | TeO$_2$ | WO$_3$ | ZnO | R$_2$O | Nb$_2$O$_5$ | XY | Tm$_2$O$_3$ | Ho$_2$O$_3$ |
|---|---|---|---|---|---|---|---|---|
| TW (I) | 15-85 | 5-55 | — | 0.5-40 | 0-15 | 4-12 | 0.2-2 | 0.2-2 |
| TW (II) | 15-85 | 5-20 | 16 | — | 4-8 | 4-12 | 0.2-2 | 0.2-2 |
| TW (III) | 15-85 | 5-25 | — | — | 5-8 | 4-12 | 0.2-2 | 0.2-2 |

Table 3 contains example mole % values for three TW-glasses (TW (I)-(III)) in accordance with the present invention. TW (I) contains an alkalimetal oxide, where R is selected from the group of Na, Li, K, Rb and Cs, whereas TW (II) contains about 16 mole % ZnO. Nb$_2$O$_5$ is used to achieve an appropriate refractive index. As before, the XY-content is preferably between 9 (or at least 8) and 11 mole % and the glasses are preferably doped with 0.2 to 2 mole % Tm$_2$O$_3$ and codoped with 0.2 to 2 mole % Ho$_2$O$_3$.

It should be noted that the technology can be applied also to other tellurite glasses than the described TZNBi and TW glasses.

As mentioned, a preferred example amplifier fiber glass is doped with thulium and uses holmium as codopant. The choice of the thulium/holmium combination for amplification in the 1500 nm window is understood when studying the diagram of FIG. 4, in which energy levels of the lanthanide ions Tb$^{3+}$, Dy$^{3+}$, Ho$^{3+}$, Er$^{3+}$, Tm$^{3+}$ and Yb$^{3+}$ are presented with focus on lower energy levels.

Figure 4:
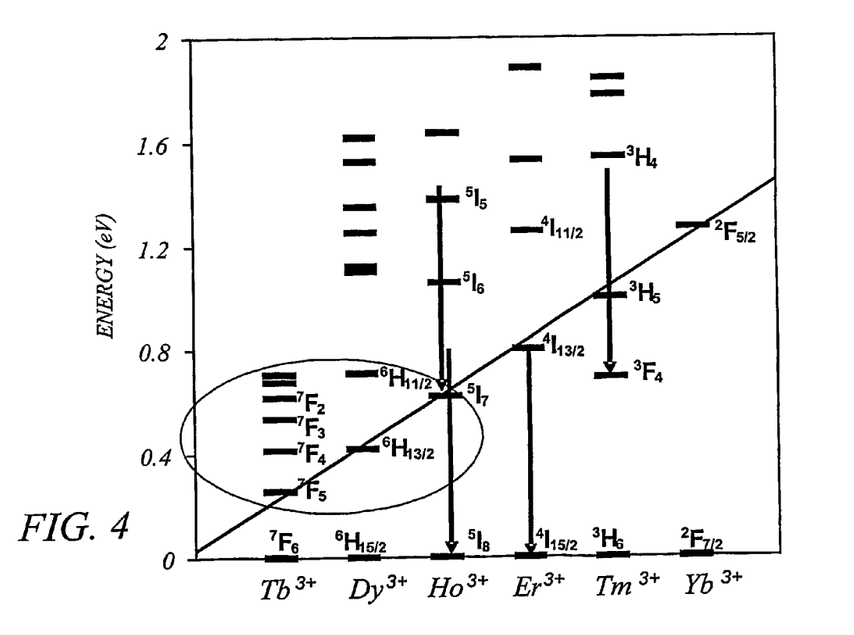
FIG. 4 shows energy levels of the lanthanide ions $Tb^{3+}$, $Dy^{3+}$, $Ho^{3+}$, $Er^{3+}$, $Tm^{3+}$ and $Yb^{3+}$ with focus on lower energy levels.

In search for suitable alternative/complementary substances to erbium (Er) for amplification around the important 1500 nm region, it is natural to investigate rare earth metals close to Er in the periodic system. In FIG. 4, arrows are provided to indicate the Er transition at 1550 nm and corresponding transitions and the trend line shows the tendency of the levels to increase in energy to the right in the periodic table. It is noticed that the $^3H_4$ to $^3F_4$ Tm$^{3+}$ transition is comparatively high in energy going to the S band (1470 nm). The Ho transitions tends to longer wavelength (L band)—the $^5I_7$ to $^5I_8$ is already in the 2000 nm region, far away from 1500 nm. The $^2F_{5/2}$ to $^2F_{7/2}$ Yb transition is also far away in the S band. Consequently, for optical amplification around 1500 nm, Tm is an appropriate choice (besides Er) and the lowest Tm energy levels should be used. The $^3H_5$ to $^3H_6$ Tm transition, for example, is too high to be interesting.

In search for a suitable acceptor for energy transfer from the Tm$^{3+}$ $^3F_4$ level, another ion or molecule with energy level slightly lower in energy, to which the energy can be transferred, is desirable. If the level mismatch is too big the energy transfer becomes less efficient. Therefore, normally the closest substances (in the periodic table) are used and Ho is highly suitable. However, there may be embodiments of the invention that transfer energy from Tm to other lanthanide ions than Ho, including levels of Dy and Tb ions with smaller energies than the $^3F_4$ level (see the circle in FIG. 4). An advantage of using Tb as acceptor is that Tb has several different levels to transfer the energy to.

Although the technology is especially advantageous for and mainly has been exemplified for amplification around 1500 nm using Tm as dopant, it should be emphasized that it is useful for tellurite glasses doped with other lanthanide ions as well. Energy transfer is useful for situations where the upper level lifetime is shorter than the lower level one. The lifetime of an electron in a certain energy level depends on the number of ways (channels) it has to decay to lower energies. The electron can decay to lower energy levels in radioactive and non-radioactive ways. The radioactive decay means photon emission that carries the excess energy far away. The non-radioactive decay occurs through phonon emission, transforming the excess energy into heat. The phonon energies are host characteristics. The efficiency of the phonon emission depends on the number of phonons necessary for the electron to reach the lower state, so they require that the upper and lower levels are sufficiently close together. When the levels are a few phonon energies away, the non-radioactive decay is very efficient and the non-radioactive lifetime very short compared to the radioactive lifetimes. On the other hand, for the levels well separated from the closest lower level the only practical decay is the radioactive one, usually much slower than the non-radioactive decays. To build up the upper level population, therefore, one seeks for these well separated levels where the fluorescence lifetime is large. The ideal is that the lower level is always empty, whereby the upper level population is always greater than the lower level population. When the level energy separation is about 2000 cm$^{-1}$ the non-radiate decay is generally very fast, keeping the lower level empty.

Table 4 lists a number of possible donor and acceptor combinations for which the enhanced energy transfer mechanism in accordance with the invention can be useful to decrease the lower level lifetime. The combinations relate to transitions where the upper and lower levels are more than 2000 cm$^{-1}$ from the closest lower level.

TABLE 4

| Donor | Acceptor | Energy transfer |
|---|---|---|
| Dy$^{3+}$ | Pr$^{3+}$, Nd$^{3+}$, Sm$^{3+}$, Eu$^{3+}$ or Tb$^{3+}$ | $^4F_{9/2} \to {}^6H_{13/2}$ |
| Ho$^{3+}$ | Pr$^{3+}$, Nd$^{3+}$, Sm$^{3+}$, Eu$^{3+}$, Dy$^{3+}$ or Tb$^{3+}$ | $^2S_2 \to {}^3I_6$ |
| Tm$^{3+}$ | Pr$^{3+}$, Nd$^{3+}$, Sm$^{3+}$, Eu$^{3+}$, Dy$^{3+}$, Tb$^{3+}$ or Ho$^{3+}$ | $^1D_2 \to {}^1G_4$ |
| Er$^{3+}$ | Pr$^{3+}$, Nd$^{3+}$, Sm$^{3+}$, Eu$^{3+}$, Dy$^{3+}$, Tb$^{3+}$, Ho$^{3+}$ or Tm$^{3+}$ | $^4S_{3/2} \to {}^4F_{9/2}$ |
| Ho$^{3+}$ | Sm$^{3+}$, Dy$^{3+}$, Er$^{3+}$ or Tm$^{3+}$ | $^3I_6 \to {}^3I_7$ |
| Pr$^{3+}$ | Sm$^{3+}$, Dy$^{3+}$, Ho$^{3+}$, Er$^{3+}$, Tm$^{3+}$ or Yb$^{3+}$ | $P_0 \to {}^1D_2$ |
| Er$^{3+}$ | Pr$^{3+}$, Sm$^{3+}$, Dy$^{3+}$, Ho$^{3+}$, Tm$^{3+}$ or Yb$^{3+}$ | $^4S_{3/2} \to {}^4F_{9/2}$ |
| Tm$^{3+}$ | Nd$^{3+}$, Dy$^{3+}$, Ho$^{3+}$, or Er$^{3+}$ | $^3F_4 \to {}^3H_4$ |
| Er$^{3+}$ | Nd$^{3+}$, Dy$^{3+}$, Ho$^{3+}$, or Tm$^{3+}$ | $^4I_{11/2} \to {}^4I_{13/2}$ |
| Pr$^{3+}$ | Nd$^{3+}$, Ho$^{3+}$, Er$^{3+}$, or Tm$^{3+}$ | $^1D_2 \to {}^1G_4$ |
| Eu$^{3+}$ | Pr$^{3+}$, Nd$^{3+}$, Ho$^{3+}$, Er$^{3+}$, or Tm$^{3+}$ | $D_3 \to D_0$ |
| Tb$^{3+}$ | Pr$^{3+}$, Nd$^{3+}$, Sm$^{3+}$, Ho$^{3+}$, or Er$^{3+}$ | $^5D_3 \to {}^5D_4$ |
| Tm$^{3+}$ | Pr$^{3+}$, Nd$^{3+}$, Sm$^{3+}$, Eu$^{3+}$, Tb$^{3+}$, Ho$^{3+}$, or Er$^{3+}$ | $^3H_4 \to {}^3H_6$ |

It should be understood that, although some tellurite glasses with halides have been presented in the prior art, those previous glasses are binary glasses where the function of the halide is completely different. In accordance with the technology, a new mechanism for and usage of the alkalihalide (preferably CsCl) is proposed.

In [5], for example, an alkalihalide is included in a tellurite glass for glass forming purposes. The binary glass (1-x) $TeO_2$-xLiCl (x=0.3, 0.4, 0.5, 0.6 and 0.7) was used, in which composition LiCl is needed to form the glass. A multicomponent glass matrix in accordance with the present invention such as $TeO_2$—$ZnO$—$Li_2O$—$Bi_2O_3$, on the other hand, can form glasses irrespective of whether a halide is present or not. Hence, in accordance with the present invention the halide is not needed to form the glass but instead added to achieve the described energy transfer enhancement and lifetime inversion.

[6] uses the metal halide $ZnCl_2$ for reducing the hydroxyl content during fiber processing in order to improve the amplifier performance. In accordance with such an approach, the halide concentration depends on the hydroxyl concentration and in [6] a binary glass with 40 mole % $ZnCl_2$ was used. In accordance with the present invention it is instead proposed that the halide has a direct role by bringing the ions closer or breaking the crystal field around the ions facilitating the energy transfer mechanism. This makes a great difference in the strategies of halide use. If you only want to eliminate OH groups, like in [6], the halide concentration depends upon the OH concentration. However, we have discovered that they have stronger direct role as glass modifier and therefore other criteria for concentrations, glass host family, as well as other halides, are used.

The technology proposes to use well-specified amounts of alkalihalide in a multicomponent glass containing a lanthanide dopant and a lanthanide codopant to decrease the transition lifetime. An alkalihalide content of 4-12 (preferably around 10) mole % is hereby appropriate. The high alkalihalide content (30-70%) or Zn-halide content (40%) used in [6] and [5], respectively, would not be applicable in this context.

An optical amplifier fiber may with advantage present the basic structure, which was described above with reference to FIG. 1. In other words, FIG. 1 is a schematic cross-sectional view of an exemplary embodiment of an optical fiber. The optical fiber 10 comprises the core 12, the cladding 14 and preferably also the protective coating 16. The core glass comprises a multicomponent tellurite glass doped with a first lanthanide oxide (preferably Tm), codoped with a second lanthanide oxide (preferably Ho) and including 4-12 mole % of at least one alkalihalide XY for enhancing the energy transfer from the first lanthanide ion to the second lanthanide ion (X=Li, Na, K, Rb, Cs and Fr and Y=F, Cl, Br and I). The amount of alkalihalide XY is preferably selected such that the ratio between the relevant upper and lower energy level lifetimes for the first lanthanide ion is reduced to a value below one.

It is important that the glass compositions of the core and cladding are about the same to avoid a significant expansion coefficient mismatch. Generally, the maximum tolerable difference between the core and clad glasses is in the range of 5%. In a preferred embodiment, the same tellurite glass composition is used as a base for both the core 12 and the cladding 14 of the optical fiber 10. The core glass can then be doped and modified to contain a higher amount of a substance used for refractive index control.

Preferably, the substance used for refractive index control is $Bi_2O_3$ or $Nb_2O_5$ and the refractive index of the core glass is about 2% higher than that of the clad glass. The difference in refractive indexes can easily assume any desired value between 0.2 and 6 % by addition of appropriate amounts of $Bi_2O_3$ or $Nb_2O_5$. The fact that the tellurite glass optical fiber allows refractive index control with $Bi_2O_3$/$Nb_2O_5$ constitutes another advantage thereof.

It should be noted that the optical fiber structure of FIG. 1 is rather simplified. Other optical fibers may present more complex structures with non-symmetrical components, graded-index cores, more than one cladding, etc.

As mentioned, the proposed glass not only presents the desired lifetime shortening but also improved thermophysical properties, such as a very high thermal stability range, which makes it suitable for drawing optical fibers. An exemplary procedure of manufacturing an optical fiber in accordance with the present invention based on the so-called rod-in-tube method will now be described. The components of the multicomponent glass, including tellurite and 4-12 mole % alkalihalide XY, are mixed together. Whereas tellurium, and lanthanide components preferably are introduced as oxides and alkali metal oxides as carbonate or nitrate, the alkalihalides can be introduced directly, i.e. as the salts CsCl, NaCl, KCl etc. The glass mixture is heated to form a glass melt. The temperature of the glass melt is brought down and at the drawing temperature, a core rod is drawn. The core refractive index is preferably controlled with $Nb_2O_5$ or $Bi_2O_3$. The core glass is doped with lanthanide oxides, such as $Tm_2O_3$ and $Ho_2O_3$.

Thereafter, a clad tube is formed by arranging clad glass melt into a silica tube and then separating the clad tube from the silica tube by cooling the aggregate. Since the silica and tellurite glass expansion coefficients differ considerably from each other, the clad tube will fall off in the cool down process. The core rod is fitted into the clad tube and an optical fiber is drawn from the perform at an appropriate drawing temperature. The drawing is preferably performed in a drawing tower with a graphite furnace with a heat zone length less than or equal to the perform diameter to avoid that the initial glass drop becomes unstable. After the first glass drop falls down the pulling velocity controls the optical fiber diameter. The drawing process is facilitated by the large thermal stability range of the glass composition, and the fibers drawn in accordance with the present invention hence disclose a minimum of erroneous features.

Figure 5:
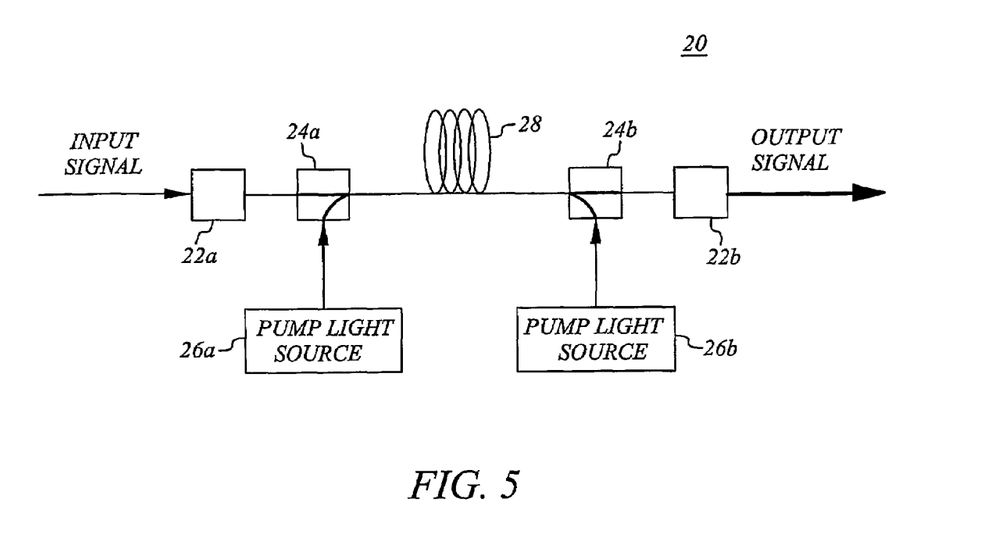
FIG. 5 is a schematic block diagram of an exemplary embodiment of an optical amplifier.

FIG. 5 is a schematic block diagram of an exemplary embodiment of an optical amplifier. The illustrated optical amplifier 20 comprises signal processing means 22, couplers 24, pump light sources 26 and an optical amplifier fiber 28. A weak optical signal that needs to be amplified is input to the amplifier 20. The input signal first passes the optional signal processing means 22a, which modifies the signal in an appropriate way. The amplifier fiber 28 is pumped at both ends with pump lasers or similar pump light sources 26a and 26b. The couplers 24a and 24b, embodied e.g. as mirrors, combine the excitation light provided by the pump light sources with the signal light. In the amplifier fiber 28, the excitation light then causes the rare-earth ions (e.g. $Tm^{3+}$) to attain a temporary excited state. As the electrons decay, light is released and the gain of the optical signal is thus increased. Finally, the amplified signal is further modified in the optional signal processing means 22b. A comparatively strong optical signal is output from the amplifier.

The optical amplifier fiber 28 of the optical amplifier 20 comprises a core of lanthanide doped tellurite glass. The core and/or cladding includes 4-12 mole % alkalihalide XY. The fiber may with advantage comprise one of the above-described multicomponent glass compositions. The amplifier fiber 28 is preferably adapted for operating in a wavelength region near 1.5 μm by being doped with Tm. It is then appropriate to use pump light sources 26, which generate excitation light at 980 nm.

The signal processing means 22 preferably comprises isolators, the purposes of which are to prevent unwanted reflections and suppress the oscillations of the amplifier. The signal processing means 22 may also include further devices for modulation, filtering, polarization, absorption, attenuation, etc.

The optical amplifier according to FIG. 5 may of course be subject to various modifications obvious to the skilled man. It would for instance be possible to use a single pump light source (and a single coupler), even though two pump light sources generally result in better amplifier efficiency. The number and position of the optional signal processing means units may vary and filters and the like can be either internal or external. There may further be more than one amplifier fiber in the optical amplifier. Besides the amplifier fiber(s), there are generally several undoped "ordinary" optical fibers in the optical amplifier, providing connections between components thereof.

Figure 6:
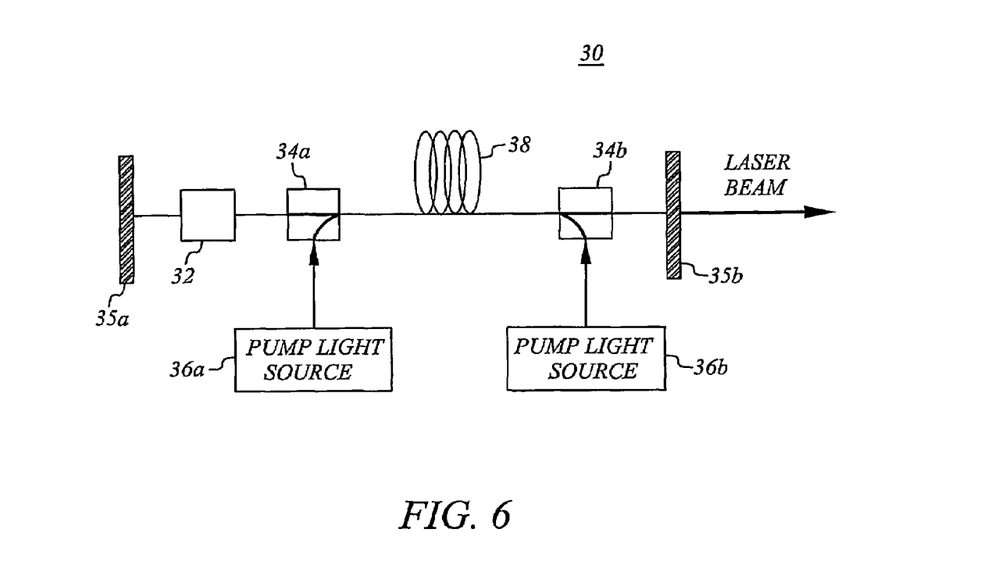
FIG. 6 is a schematic block diagram of an exemplary embodiment of a laser device.

The above-described optical amplifier glass may also be used in a laser device. FIG. 6 is a schematic block diagram of an exemplary embodiment of a laser device. Each laser device component is provided with the same reference number as the corresponding amplifier component (FIG. 4) plus 10. The main difference between the laser device and the optical amplifier is that the laser device does not receive a signal light input but has feedback for signal generation. The laser device 30 of FIG. 5 accordingly comprises two reflectors 35, placed at opposite ends of the optical amplifier fiber 38. Excitation light from the pump light sources 36 give rise to photon emission in the amplifier fiber 38 in the same way as for the optical amplifier. The first reflector 35a is preferably a high reflector mirror, ideally reflecting all light, whereas the second reflector 35b is a partially transparent mirror. The relatively small fraction of light passing through the second reflector is the laser beam output of the laser device 30. Optional signal processing 32 of the laser device may include internal or external devices for modulation, filtering, polarization, q-switching, absorption and the like.

In another embodiment (not shown) of the laser device, feedback is instead achieved by a ring-shaped structure, where a part of the output signal basically is led back to the coupler 34a.

Lasers with lanthanide-doped tellurite glasses, both in the form of optical fibers or just a rod, offer a couple of important advantages as compared to conventional lasers. Firstly, the larger bandwidth allows shorter pulses for mode locked lasers. Secondly, the tellurite glass lasers have a larger tuning range for cw or pulsed lasers, which is particularly important in spectroscopic applications or even as signal source in a WDM communication system. These advantageous features are obtained by using the proposed glass for lasing optical fiber elements.

Although the invention has been described with reference to specific illustrated embodiments thereof, it should be understood that various modifications and changes also lie within the scope of the claims.

REFERENCES

[1] M. Naftaly, S. Shen and A. Jha, "$Tm^{3+}$ doped tellurite glass for broadband amplifier at 1.47 μm", Appl. Opt. 39(27) 4979-84.

[2] S. Shen, A. Jha, E. Zhang and S. J. Wilson, Compt Rendu Chimie, 5, pp. 921-938 (2002).

[3] Nippon T&T, European patent application EP 0 858 976.

[4] Aitken et. al., U.S. Pat. No. 6,194,334.

[5] G. Özen, B. Demirata, M. L. Öveçoglu and A. Genç, "Thermal and optical properties of $Tm^{3+}$ doped tellurite glasses", Spectrochim. Acta, Part A 57, 273-280 (2001).

[6] E. R Taylor, L. N. Ng and N. P. Sessions, "Spectroscopy of $Tm^{3+}$-doped tellurite glasses for 1470 nm fiber amplifier", J. Appl. Phys. 92, 112-117 (2002).

The invention claimed is:

1. A multicomponent tellurite glass composition suitable for optical fiber amplifiers doped with a first lanthanide ion and a second lanthanide ion, and further comprising 4-12 mole % of at least one alkalihalide XY for enhanced energy transfer from the first lanthanide ion to the second lanthanide ion, X being selected from the group of Li, Na, K, Rb, Cs and Fr and Y being selected from the group of F, Cl, Br and I, and said glass composition further comprising (in mole %):

15-85% $TeO_2$;
0-35% $WO_3$; and
0-20% $Nb_2O_5$.

2. The glass composition according to claim 1, wherein the amount of alkalihalide XY is such that a ratio between relevant lower and upper energy level lifetimes of the first lanthanide ion is reduced to a value below one.

3. The glass composition according to claim 1, comprising at least 8 mole % of the alkalihalide XY.

4. The glass composition according to claim 1, comprising 9-11 mole % of the alkalihalide XY.

5. The glass composition according to claim 1, wherein the halide Y is Cl.

6. The glass composition according to claim 5, wherein the alkalihalide XY is CsCl.

7. The glass composition according to claim 1, wherein the first lanthanide ion is $Tm^{3+}$ and the second lanthanide ion is selected from the group of $Nd^{3+}$, $Er^{3+}$, $Dy^{3+}$, $Tb^{3+}$ and $Ho^{3+}$.

8. The glass composition according to claim 7, wherein the second lanthanide ion is $Ho^{3+}$.

9. An optical amplifier fiber (10) comprising a core (12) surrounded by at least one cladding (14), wherein the core is at least partly formed of the multicomponent tellurite glass composition of claim 1.

10. The amplifier fiber according to claim 9, wherein the amount of alkalihalide XY in the glass composition is such that a ratio between relevant lower and upper energy level lifetimes of the first lanthanide ion is reduced to a value below one.

11. The amplifier fiber according to claim 9, wherein the glass composition comprises at least 8 mole % of the alkalihalide XY.

12. The amplifier fiber according to claim 9, wherein the glass composition comprises 9-11 mole % of the alkalihalide XY.

13. The amplifier fiber according to claim 9, wherein the halide Y of the glass composition is Cl.

14. The amplifier fiber according to claim 13, wherein the alkalihalide XY of the glass composition is CsCl.

15. The amplifier fiber according to claim 9, wherein the first lanthanide ion of the glass composition is $Tm^{3+}$ and the second lanthanide ion is selected from the group of $Nd^{3+}$, $Er^{3+}$, $Dy^{3+}$, $Tb^{3+}$ and $Ho^{3+}$.

16. The amplifier fiber according to claim 15, wherein the second lanthanide ion of the glass composition is $Ho^{3+}$.

17. An optical amplifier (20) including an optical amplifier fiber (28) according to claim 9.

18. The optical amplifier according to claim 17, wherein the glass composition comprises 9-11 mole % of the alkalihalide XY.

19. The optical amplifier according to claim 17, wherein the halide Y of the glass composition is Cl.

20. The optical amplifier according to claim 19, wherein the alkalihalide XY of the glass composition is CsCl.

21. The optical amplifier according to claim 17, wherein the first lanthanide ion of the glass composition is $Tm^{3+}$ and the second lanthanide ion is selected from the group of $Nd^{3+}$, $Er^{3+}$, $Dy^{3+}$, $Tb^{3+}$ and $Ho^{3+}$.

22. The optical amplifier according to claim 21, wherein the second lanthanide ion of the glass composition is $Ho^{3+}$.

23. A laser device (30) including an optical amplifier fiber (38) according to claim 9.

* * * * *